April 18, 1967

E. M. JOST 3,314,822

METHOD OF MAKING STORAGE BATTERY PLAQUES

Filed May 18, 1964

Ernest M. Jost,
Inventor.
Koenig, Senniger,
Powers and Leavitt,
Attorneys.

United States Patent Office 3,314,822
Patented Apr. 18, 1967

3,314,822
METHOD OF MAKING STORAGE BATTERY PLAQUES
Ernest M. Jost, Attleboro, Mass., assignor to Texas Instruments Incorporated, Dallas, Tex., a corporation of Delaware
Filed May 18, 1964, Ser. No. 368,055
2 Claims. (Cl. 136—24)

This invention relates to storage battery plaques, and with regard to certain more specific features, to sintered porous plaques for nickel and nickel-cadmium batteries.

Among the several objects of the invention may be noted the provision of a process for manufacturing plaques for nickel-cadmium or nickel batteries in which the plaques contain comparatively large amounts of active materials; the provision of a low-cost process of the class described which substantially reduces the time and the number of operations required effectively to place materials in the pores of the plaques; and the provision of a process of this class which results in comparatively thin plaques having improved pore utilization and which are useful for making batteries having comparatively high electrical capacities relative to their weights and volumes. Other objects and features will be in part apparent and in part pointed out hereinafter.

The invention accordingly comprises the compositions, elements, and combinations thereof, steps and sequence of steps, and features of manipulation which will be exemplified in the products and processes hereinafter described, and the scope of the application of which will be indicated in the following claims.

In the accompanying drawings, in which several of various possible embodiments of the invention are illustrated, FIG. 1 is a diagrammatic perspective view illustrating a first step performed according to one form of the invention;

Corresponding reference characters indicate corresponding parts throughout the several views of the drawings.

Figure 1:
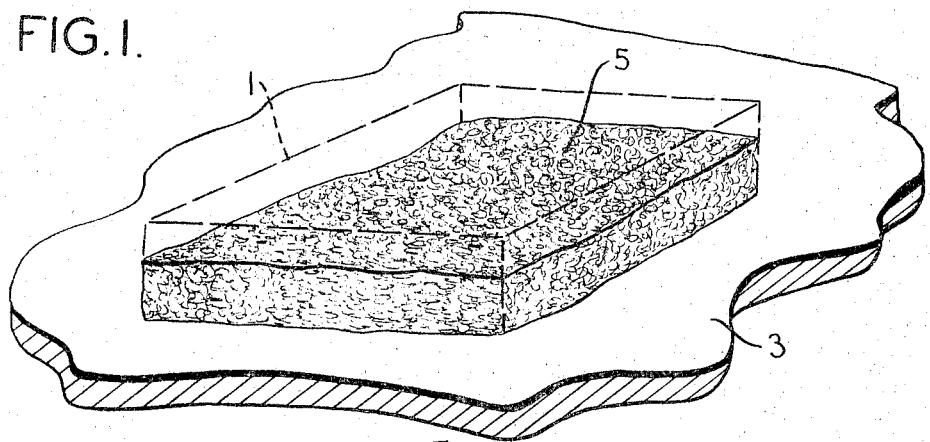

As presently known, sintered plaques for nickel-cadmium or nickel batteries are impregnated by dipping them into highly concentrated solutions of $$Cd(NO_3)_2 4H_2O$$

and/or $Ni(NO_3)_2 6H_2O$ (cadmium nitrate and nickel nitrate, respectively). The nitrate material is subsequently converted in the sintered plaques to $Cd(OH)_2$ and/or $Ni(OH)_2$ (cadmium hydroxide and/or nickel hydroxide) respectively. The conversion from nitrate to hydroxide is accompanied by considerable weight and volume changes. For example, in the case of a cadmium-nickel battery:

Molecular weight $Cd(NO_3)_2 4H_2O = 308.5$ gm.
Volume of one mole $Cd(NO_3)_2 4H_2O = 126$ cm.$^3$ (density 2.45)
Molecular weight of $Cd(OH)_2 = 146.4$ gm.
Volume of one mole of $Cd(OH)_2 = 30$ cm.$^3$ The weight of $Cd(OH)_2$ (cadmium hydroxide) after conversion is 47.5% of the original $Cd(NO_3)_2 4H_2O$ (cadmium nitrate) weight, and the volume of the cadmium hydroxide is only 23.8% of the volume occupied by the original cadmium nitrate. This means that even if the nitrate were originally to fill the total available pore volume of the sintered plaque, the resulting $Cd(OH)_2$ (cadmium hydroxide) after conversion would theoretically only occupy 23.8% of the pore volume. This represents a low volume utilization efficiency.

For the nickel batteries, conditions are even more unfavorable, as shown below:

Molecular weight of $Ni(NO_3)_2 6H_2O = 290.8$ gm.
Volume of one mole $Ni(NO_3)_2 = 142$ cm.$^3$ (density 2.05)
Molecular weight of $Ni(OH)_2 = 92.7$ gm.
Volume of one mole of $Ni(OH)_2 = 22.6$ cm.$^3$ (density 4.1)

Thus in this case the nickel hydroxide occupies only 15.9% of the volume originally occupied by the cadmium nitrate, and 31.8% of the original weight. Here again there exists a low volume utilization efficiency.

The weight and density relationships of the nitrates and hydroxides (as shown in the above two examples) do not allow a sufficient amount of active materials to fill the pores, even if full utilization of the pores by the nitrates were to be assumed. Therefore, conventionally the impregnation cycle is repeated up to as much as ten times in order to increase infilling of the pores. Considering that one impregnation cycle alone consists of four or five operations (dipping, drying, conversion, washing, drying), each plaque must undergo up to forty or fifty operations before it can be used in a battery cell. This is very costly, as shown by the fact that today's sintered plaque nickel-cadmium batteries are almost as expensive on a w.-hr. per pound basis as silver-cadmium batteries, which deliver only twice as many w.-hr. per pound, although nickel is approximately twenty times cheaper than silver. Moreover, in both the above cases, unused pore volume unduly bulks the plaque for a given weight. Therefore, an object of my improved process is with the least trouble to have the plaque pores as completely filled as possible with active materials and to reduce the finished plaque volume for a given capacity and weight. According to a preferred form of the present invention, sintered nickel-flake plaques are subject to a procedure which permits of the incorporation of sufficient amounts of active material in one impregnation cycle. A specific illustration for the case of a cadmium-nickel plaque will best elucidate the invention, as follows:

A plaque of the following dimensions, 5 x 5 x .4 cm. is produced by sintering a mass of loose nickel flakes, i.e., without pressure, at a temperature of approximately 1000° C. for one to two hours. This may be accomplished as shown in FIG. 1, wherein a framework 1, illustrated by dotted lines, is placed on a platen 3, with the nickel flakes 5 poured into the frame 1 to the depth of .4 cm. Then heating is effected to effect the sintering, after which the sintered mass may be removed as a porous plaque from the frame 1. The plaque at this stage has an apparent density smaller than 0.1 gm. per cubic centimeter (typically 0.08 to 0.09 gram per cubic centimeter). The volume of the plaque is 10 cubic centimeters, and the porosity is in excess of 95%, and preferably 98% to 99%. The weight is approximately 1.2 grams. However, the plaque in this form is too weak and too thick for practical use. The nickel flakes before sintering are of the usual type supplied for battery manufacture, being on the order of thickness of .00004 inch, and .004 square inch or so in area.

The bulky sintered plaque thus obtained is dipped into fused $Cd(NO_3)_2 4H_2O$ at 70° C. (i.e., 10° C. above the melting point of the nitrate). After allowing the plaque to saturate itself for a few minutes, it is withdrawn from the melt and allowed to cool. The plaque now weighs 16.1 gm. [14.9 gm. constitutes the weight of the solidified $Cd(NO_3)_2 4H_2O$, and 1.2 gm. the weight of the sintered nickel flake].

The plaque is then dehydrated in a vacuum of approximately one millimeter (Hg) for three to four hours at approximately 50° C. [i.e., 10° C. below the melting point of Cd(NO$_3$)$_2$4H$_2$O]. After this procedure, the $$Cd(NO_3)_2 4H_2O$$

has been substantially transformed to Cd(NO$_3$)$_2$, i.e., it has lost its crystal water. The melting point of water-free Cd(NO$_3$)$_2$ is 350° C.

The plaque is then treated cathodically in hot (100° C.) 30% KOH potassium hydroxide solution in a conventional manner, in order to convert the nitrate Cd(NO$_3$)$_2$ to the hydroxide without the danger of losing it by dripping out of the pores, as would happen if the Cd(NO$_3$)$_2$4H$_2$O with a melting point of 59° C. had been dipped into the hot KOH solution. The plate now contains approximately 6 gm. of active materials only partly occupying a total pore volume of 10 cubic centimeters. This corresponds to a volume utilization efficiency of only 13%. It will be understood that other alkali metal hydroxides besides potassium hydroxide could be used.

Figure 2:
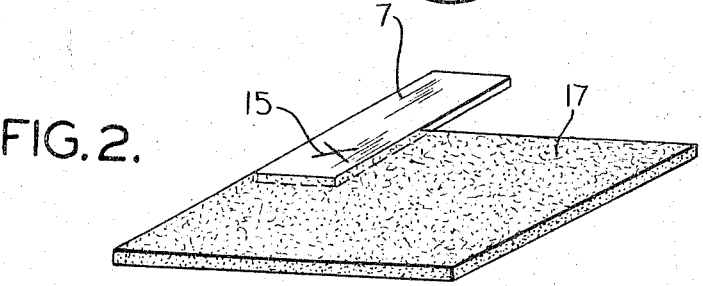
FIG. 2 is a diagrammatic view similar to FIG. 1, illustrating a last step.

Next, as illustrated in FIG. 2, an appropriate conductive terminal 7 may be applied at one corner of the plaque. It is then compressed by a pressure of approximately 125 p.s.i. to a thickness of approximately .12 cm. At this stage the terminal has been pressed down and may be spot-welded as indicated at 15. The plate volume is now approximately 3.0$^3$ cm. and the pore volume utilization efficiency is greatly improved, being then about 42%. The resulting plate is ready for use. It is numbered 17 in FIG. 2. After compression the porosity may be on the order of 94% to 95% or less.

Figure 3:
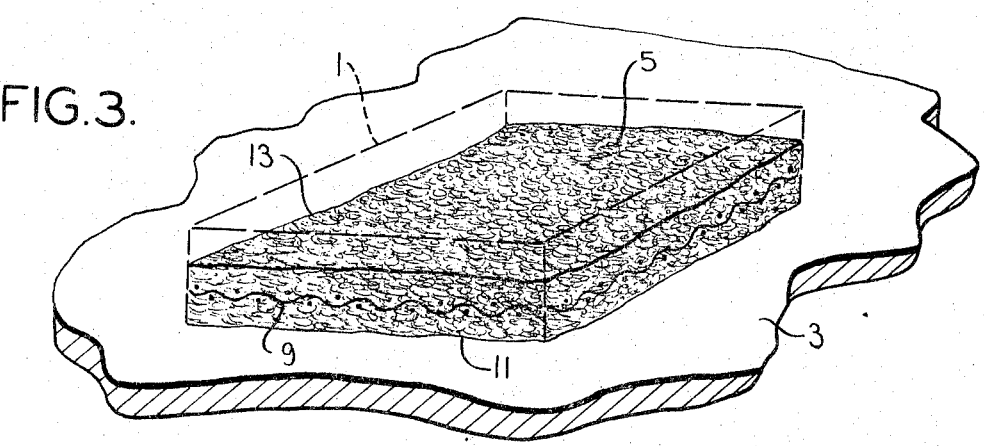
FIGS. 3 and 4 are views similar to FIGS. 1 and 2, respectively, illustrating first and last steps performed in connection with an alternate form of the invention.
Figure 4:
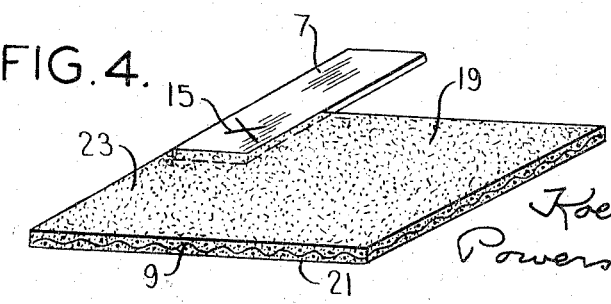

In FIGS. 3 and 4 is illustrated a method corresponding to that of FIGS. 1 and 2, except that during placement of the nickel flakes in the frame 1 a suitable nickel open-wire mesh 9 is interleaved between a lower layer 11 and an upper layer 13 of the nickel flakes. Thereafter the process is as above described, with a resulting product such as shown in FIG. 4, wherein the plate is the same as in FIG. 2 except that it contains the wire mesh, which gives added mechanical strength to the plaque. This finished plaque is numbered 19 in FIG. 4. Its compressed layers above and below the wire mesh 9 are numbered 23 and 21, respectively.

While the nickel flakes are preferable for the particulate or finely divided starting material, in some cases flakes of other metals such as iron, copper, silver or the like may be used.

In view of the above, it will be seen that the several objects of the invention are achieved and other advantageous results attained.

As various changes could be made in the above products and processes without departing from the scope of the invention, it is intended that all matter contained in the above description or shown in the accompanying drawings shall be interpreted as illustrative and not in a limiting sense.

What is claimed is:
1. The method of making a battery plaque comprising sintering a comparatively thick layer of nickel flakes to form a porous plaque, saturating the sintered plaque substantially to infill its pores with a melt of a nitrate selected from the group consisting of cadmium nitrate, nickel nitrate and mixtures thereof, cooling the plaque to solidify the nitrate, heating the saturated plaque under a vacuum at a temperature below the melting temperature of the nitrate to dehydrate the nitrate by removing its crystal water while it is in the solid state within the plaque, converting the dehydrated nitrate while in its solid state to an hydroxide by cathodically treating the plaque in an alkali metal hydroxide, and compressing the cathodically treated plaque.

2. The method of making a battery plaque comprising sintering a comparatively thick layer of nickel flakes on a nickel wire mesh to form a reinforced porous plaque, saturating the sintered plaque substantially to infill its pores with a melt of a nitrate seelcted from the group consisting of cadmium nitrate, cooling the plaque to solidify the nitrate, nickel nitrate and mixtures thereof, heating the saturated plaque under a vacuum for several hours at a temperature below the melting point of the nitrate to dehydrate the nitrate by removing its crystal water while it is in the solid state in the plaque, converting the dehydrated nitrate while in its solid state to an hydroxide by cathodically treating the plaque in a hot alkali metal hydroxide, and compressing the reinforced and cathodically treated plaque.

References Cited by the Examiner

UNITED STATES PATENTS

| | | | |
|---|---|---|---|
| 2,672,494 | 3/1954 | Fleischer | 136—29 X |
| 2,861,115 | 11/1958 | Berg | 136—28 |
| 2,909,586 | 10/1959 | Hagspihl | 136—28 |
| 3,009,979 | 11/1961 | Corren et al | 136—29 |
| 3,041,388 | 6/1962 | Fukuda et al. | 136—24 |
| 3,174,879 | 3/1965 | Stanimirovitch | 136—6 |
| 3,184,339 | 5/1965 | Ellis | 136—75 |
| 3,185,591 | 5/1965 | Bartfai et al. | 136—75 |
| 3,186,871 | 6/1965 | Donohue | 136—29 |

WINSTON A. DOUGLAS, *Primary Examiner.*

B. J. OHLENDORF, A. SKAPARS,
*Assistant Examiners.*

UNITED STATES PATENT OFFICE
CERTIFICATE OF CORRECTION

Patent No. 3,314,822　　　　　　　　　　　　　　April 18, 1967

Ernest M. Jost

It is hereby certified that error appears in the above numbered patent requiring correction and that the said Letters Patent should read as corrected below.

Column 4, line 24, for "seelected" read -- selected --; lines 25 and 26, strike out "consisting of cadmium nitrate, cooling the plaque to solidify the nitrate, nickel nitrate and mixtures thereof, heating" and insert instead -- consisting of cadmium nitrate, nickel nitrate and mixtures thereof, cooling the plaque to solidify the nitrate, heating --.

Signed and sealed this 14th day of November 1967.

(SEAL)

Attest:

Edward M. Fletcher, Jr.

Attesting Officer

EDWARD J. BRENNER

Commissioner of Patents